Feb. 27, 1951     A. J. BRADFORD ET AL     2,543,656
ROTATABLE SHAFT POSITION INDEXING DEVICE
Filed Feb. 7, 1948     2 Sheets-Sheet 1

INVENTORS
ARTHUR J. BRADFORD
CREBERT BURNHAM
BY
ATTORNEYS

Feb. 27, 1951  A. J. BRADFORD ET AL  2,543,656
ROTATABLE SHAFT POSITION INDEXING DEVICE
Filed Feb. 7, 1948  2 Sheets-Sheet 2

INVENTORS
ARTHUR J. BRADFORD
CREBERT BURNHAM
BY
ATTORNEYS

Patented Feb. 27, 1951

2,543,656

UNITED STATES PATENT OFFICE 2,543,656

ROTATABLE SHAFT POSITION INDEXING DEVICE

Arthur J. Bradford, Chicago, and Crebert Burnham, Glenview, Ill., assignors to Ampro Corporation, Chicago, Ill., a corporation of Illinois Application February 7, 1948, Serial No. 7,014

7 Claims. (Cl. 88—28)

The present invention relates to indexing devices for rotatable shafts, for arresting rotation of such shafts in predetermined angular positions, and is more particularly directed to novel provision for adjustment of the indexing mechanism whereby, without changing the angular intervals between the positions in which the shaft is stopped, adjustments may be made in the absolute stop positions, that is to say in the positions relative to the horizontal and the vertical.

The device is ideally useful in slide film projectors, wherein a film strip having successive frames printed on it is moved through a film guide and across an aperture that is aligned with the optical system of the projector. In such a device, movement of the film is accomplished in step by step fashion by a rotatable sprocket, and indexing of the sprocket rotation to register each frame with the aperture is accomplished by a detent device arranged to arrest rotation of the sprocket in angular positions properly spaced to align the successive frames properly with the aperture. Since the film sprocket holes are spaced much more closely than the frames, it often happens that in threading a film into the projector it will engage the sprocket in such longitudinal position that its frames will be out of register when the sprocket is stopped in its different indexed position. Thus it is necessary to provide for adjustment of the index positions to provide for indexing with the film frames in proper alignment. Such an adjustment is known in the art as "framing."

As indicated above, the adjustable indexing mechanism herein disclosed is ideally suited for framing purposes in slide projectors. It will be evident, however, that it is suitable for a wide variety of uses wherein it is desirable to provide for adjustment of the indexed positions in which a rotatable shaft is arrested.

The primary object of the invention is to provide in a position indexing assembly for a rotatable shaft, a novel, highly effective and simple device arranged to lock the indexing device for normal indexing operation and for releasing it to permit rotating adjustment of the index positions that the assembly imposes on the shaft.

Another object is to provide an inexpensive, positive locking device for the stationary member of a relatively rotatable cam and follower indexing assembly, capable of holding the stationary member securely against unintended rotation to thereby provide accurate indexing, but readily releasable to permit such member to be released for rotation with the rotatable member, so that the angular position of the stationary member can be rotated to adjust the index positions.

Still another object is to provide a novel operating system for such an adjustable indexing detent, which is positive and foolproof, requires no skill to operate, and that is simple and inexpensive to manufacture and install.

An additional object is to provide an improved indexing device for a slide film projector, which device includes provision for framing.

The invention is herein disclosed as installed in a film-moving mechanism of a slide film projector, since it is ideally suited to that service.

Figures 1, 2, 3, 4:
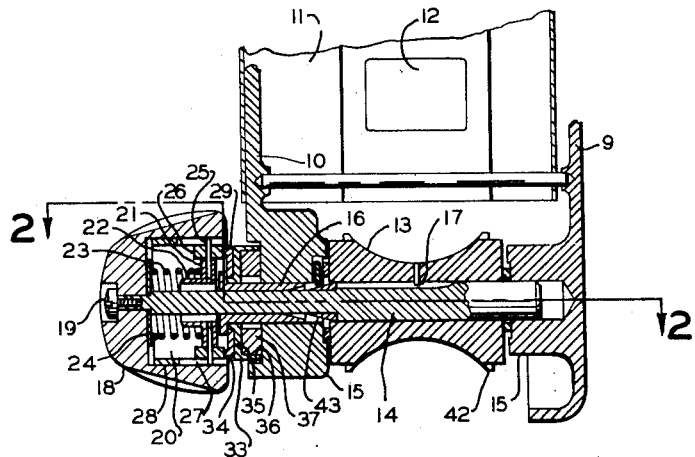
Figure 1 is a vertical fragmentary section of a portion of the film-handling mechanism of a slide film projector, taken on lines to show part of the film gate and aperture, and the vertical center line of the film-moving sprocket and its indexing mechanism.
Figure 2 is a horizontal section on line 2—2 of Figure 1.
Figure 3 is a perspective view of the indexing detent assembly and the release mechanism by means of which framing is accomplished.
Figure 4 is an enlarged elevation, partly broken, showing the locking and release device for the indexing detent.
Figure 5:
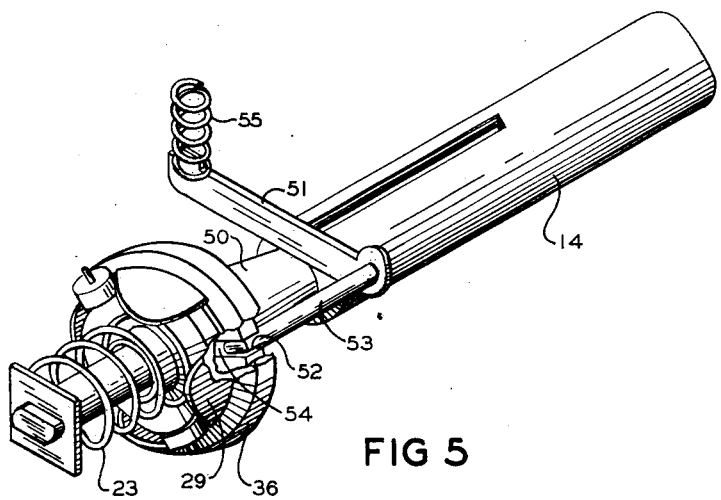
Figure 6:
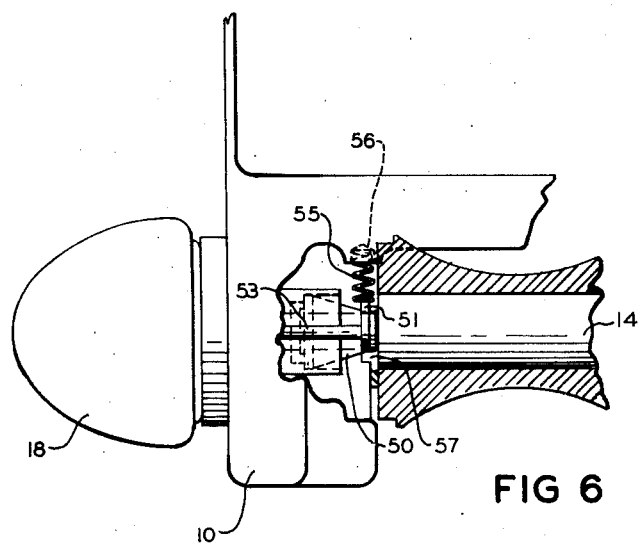

Figures 5 and 6 respectively are views corresponding respectively to Figures 1 and 3, showing a modified arrangement of the invention.

Describing the drawings in detail, in Figure 1 the numerals 9, 10 are applied to spaced walls forming parts of a stationary frame casting of a slide film projector. The projector includes a film gate structure, indicated at 11, which defines the projection aperture 12 with which the frames of a film being projected are successively registered.

The film-moving sprocket 13, herein shown as a sprocket spaced below the aperture 12 for drawing the film across the aperture from an upper supply source, is carried by a rotatable shaft 14 journalled between bosses 15 on the casting walls 9, 10, and extends through one of the walls 10 to project on the operator's side of the projector. Preferably a bushing 16 is mounted in the wall 10 and projects outwardly to support the detent indexing mechanism. The sprocket 13 is keyed to the shaft 14 by a pin and slot assembly 17 that permits the shaft to move axially.

The shaft 14 is rotatable by a knob 18 which is locked to it by the screw 19. In a bore 20 in the knob 18 a carriage 21 is axially movable, being provided with a central boss 22 freely surrounding shaft 14 and serving as a seat for a coil spring 23 that also surrounds the shaft and bears oppositely against a plate 24, secured to the knob and shaft at the inner end of the bore 20, and the carriage 21 to urge the latter toward the casting 10. The carriage 21 constitutes a cam follower, carrying radial shafts 25 that project from the carriage to carry cam rollers 26, while the ends of the shaft 25 are slidable in tracks 27 in a cylindrical shell 28 mounted in the bore 20 and rotatable with the knob.

The cam rollers 26 ride the profiled edge of a cylindrical cam track 29 which is supported by the adjacent casting wall 10, the shape of the edge being designed to provide risers 30 and dwells 31. In operation, as knob 18 is turned, shaft 14 and sprocket 13 turn with it to move a film engaged with the sprocket past the aperture 12. Carriage 21 turns with the nkob, due to the positive connection provided by engagement of the ends of shaft 25 in the tracks 27, forcing the rollers 26 to ride the cam track to which they are held by spring 23. As the rollers move from dwells 31 up the risers 30, the spring 23 is compressed, and when they reach the dwells they are forced into them by expansion of the spring, thereby providing the required detent action. The angular position of the dwells are arranged to arrest the assembly of knob, shaft and sprocket at intervals that are correct to register successive frames of a film engaged with the sprocket with the aperture 12.

In order to provide for framing, the cam track 29 is mounted to permit it to be rotated, and the mounting includes locking means to prevent its rotation for normal indexing operation. The cam track 29 is formed as a flange, or series of risers, on a plate 31 which is rigidly fixed to a cup member 33 comprising a central flange 34 supported on bushing 16, a circular body 35 and a cylindrical skirt 36. The skirt 36 closely surrounds, and is rotatable upon a split ring 37 which is secured at one of its sides to the casting wall 10 by a pin 38, and which has an open center providing clearance for the bushing 16. At the other side of the open center from pin 38, and in the slot 39 that splits the ring, is a flat cam 40 that controls the expansive condition of the ring. The expansive condition of the ring governs the frictional contact between its periphery and the surrounding skirt 36, thereby controlling rotation of the skirt and the cam assembly that is secured to it, the split ring 37 being keyed to wall 10 against rotation, by pin 38.

The flat cam 40 comprises the flattened end of an operating shaft 41 projecting through and journalled in the casting wall 10. On the inner side of wall 10, shaft 41 carries an operating lever 42 an edge of which bears on a conical surface 43 carried by shaft 14, so that axial movement of latter swings the lever and turns shaft 41 and flat cam 40, thereby changing the expansive condition of the split ring. In its normal condition, the ring is contracted, permitting the cam assembly to rotate. Expansion of the ring against its resilience urges it into locking contact with the skirt 36, the cam assembly being thereby locked to the casting wall 10 against rotation with the knob and follower assembly.

As indicated above, shaft 14 and its conical surface 43 are axially movable to control the angular relation of the flat cam 40 relative to the sides of the slot 39, thereby controlling the locking effect between the split ring 37 and the skirt 36 of the cam track mounting assembly. The conical surface, lever 42 and flat cam 40 are so arranged that with the knob in its normal operating position, which is at the outward limit of its axial movement with the shaft 14, the flat cam 40 is turned from parallel relation to the sides of the slot 39, so that the ring is maintained expanded and in locking relation to the skirt 36 and the cam track assembly. Since the knob is urged to its normal operating position by the spring 23, the assembly normally is held in this condition. Turning the knob 18 rotates the follower assembly relative to the cam track and produces the indexing operation.

For framing, knob 18 is thrust toward casting wall 10. Movement of the conical surface 43 permits lever 42 to swing inward toward the axis of shaft 14 and the flat cam 40 to swing toward parallel relation to the sides of slot 39, these movements being accomplished by force of the resilient split ring in tending to contract to its normal condition. Contraction of the split ring releases skirt 36 and the cam track assembly from their locked relation to casting wall 10, so cam track 29 may turn with the knob and follower assembly. It will be noted that the inward thrust of the knob 18 to release the indexing mechanism compresses coil spring 23, increasing the force that urges rollers 26 into the dwells of the cam track and thereby increasing the coupling effect between the knob and cam track. When this coupling has been effected and the cam track released for rotation with the knob, rotation of the knob until a film frame is brought into proper register with aperture 12 is accompanied by rotation of the cam track to position its dwells properly to register other frames with the aperture as the indexing is accomplished during rotation of the sprocket after the knob has returned to its operating position and the cam track has been relocked to the casting 10.

Referring to Figures 5 and 6, a modified system is disclosed wherein resilience of the split clutch ring is not relied upon for return of the operating shaft and lever, and the spring 23 does not serve as the actuating power means for expanding the split ring into its locking, or indexing position. In this form the conical surface 50 tapers inwardly, so that inward movement of the knob 18 and shaft 14 positively swings the lever 51 in a direction away from the shaft 14. The flat cam surfaces 52 at the end of the clutch actuating shaft 53, which is rotated by swinging of the lever, are in such angular relation to the lever that during this positive swinging of the lever the cam surfaces approach parallel relation to the sides of the slot 54 of the split ring, permitting the ring to contract to release the cam track assembly 29, 36 for rotation in framing. Thus the shaft 53 and lever 51 are moved by the sprocket shaft instead of by force of the split ring as the framing condition of the assembly is approached.

A compression spring 55 has one of its ends seated in a bore 56 at one side of the recess 57 in the casting wall 10 within which the lever 51 is arranged. The other end of the spring 55 bears upon the end of the lever 51 to maintain the lever in contact with the conical surface 50, and the spring supplies force for swinging the lever toward the axis of the sprocket shaft 14 as such shaft moves outwardly, thereby rotating actuating shaft 53 and expanding the split ring to its locking or detent condition.

Each of the systems herein disclosed is based upon the employment of a pair of relatively rotatable indexing detent members, one of which is normally locked against rotation to cooperate with the other in performing the detent function, but which is releasable for rotation to permit selection of the angular position wherein detent action occurs. In the practical arrangements of the system herein shown, locking and release are accomplished in a simple, highly convenient manner by employment of the axially movable conical surface and cooperating lever providing control of the locking clutch by axial movement of the indexed shaft. This is particularly convenient in an assembly wherein the indexed shaft is rotated manually. As indicated, such a system, though highly useful in a strip film projector, is not limited to use in such a device.

We claim:

1. In an indexing assembly for exerting a detent action upon a rotatable shaft in a predetermined angular position, said assembly comprising a pair of detent members relatively rotatable and cooperating in predetermined angular relation to exert a detent action, one of said members rotating with the shaft and the other being mounted on a stationary support, and a knob rotatable for turning said shaft; means permitting selection of the angular position of the shaft in which detent action is exerted comprising, mounting means for the support-mounted detent member arranged to permit said member to be rotated by the cooperating detent member, a releasable clutch normally locking the support-mounted member to the support against such rotation, and actuating means for said clutch including an element movable by axial motion of said knob for disengaging said clutch.

2. In an indexing assembly for exerting a detent action upon a rotatable shaft in a predetermined angular position, said assembly comprising a pair of detent members relatively rotatable and cooperating in predetermined angular relation to exert a detent action, one of said members being rotatable with the shaft and the other being mounted on a stationary support; means permitting selection of the angular position of the shaft in which detent action is exerted comprising, an expansible substantially cylindrical element secured to the support and keyed to it against rotation, a cylindrical sleeve rotatably surrounding said element and secured to the support-mounted detent member to support the latter, and means for varying the expansive condition of said cylindrical element selectively to permit said support-mounted detent member to rotate with the cooperative member or to lock it against such rotation.

3. In an indexing assembly for exerting a detent action upon a rotatable shaft in a predetermined angular position, said assembly comprising detent members relatively rotatable and cooperating in predetermined angular relation to exert a detent action, one of said members being rotatable with the shaft and the other being mounted on a stationary support; means permitting selection of the angular position of the shaft in which detent action is exerted comprising a substantially cylindrical split ring secured to the support against rotation and having a slot extending from its opening to its periphery to permit change in its expansive condition, a cylindrical sleeve rotatably surrounding said ring and secured to the support-mounted detent member for rotatably supporting the latter, and a movable controlling device arranged in the slot for varying the expansive condition of the split ring selectively to permit said support-mounted detent member to rotate with the cooperative member or to lock it against such rotation.

4. In an indexing assembly for exerting a detent action upon the rotary movement of a rotatable and axially movable shaft in a predetermined angular position, said assembly comprising a pair of detent members relatively rotatable and cooperating in predetermined angular relation to exert a detent action, one of said members being rotatable with the shaft and the other being mounted on a stationary support; means permitting selection of the angular position of the shaft in which detent action is exerted comprising, a substantially cylindrical split ring secured against rotation to the support and having a slot extending between its opening and periphery to permit change in its expansive condition, a cylindrical sleeve rotatably surrounding said split ring and secured to the support-mounted detent member for rotatably supporting the latter, a movable cam arranged in said slot for varying the expansive condition of the split ring selectively to permit said support-mounted detent member to rotate with the cooperative detent member or to lock it against such rotation, operating mechanism for said cam, and an actuating element carried by the shaft and arranged to actuate said mechanism upon axial movement of the shaft.

5. In an indexing assembly for exerting a detent action upon rotary movement of a rotatable and axially movable shaft in a predetermined angular position, said assembly comprising detent members relatively rotatable and cooperating in a predetermined angular relation to exert a detent action, one of said members being rotatable with the shaft and the other being mounted on a stationary support; means permitting selection of the angular position of the shaft in which detent action is exerted comprising a substantially cylindrical split ring secured to the support against rotation and having a slot extending between its opening and periphery to permit change in its expansive condition, a cylindrical sleeve rotatably surrounding said split ring and secured to the support-mounted detent member for rotatably supporting the latter, a flat cam arranged in the slot for rotation to change the expansive condition of the ring, an actuating shaft rotatably mounted and secured to the cam in coaxial relation for rotating it, a lever secured to the remote end of the actuating shaft, and a conical surface coaxial and movable axially with the first shaft and contacting said lever to swing the latter as the first shaft is moved axially.

6. In a slide film projector comprising spaced walls respectively adjacent and remote from an operator's position, a film guide disposed in transverse relation between said walls, a projection aperture in said guide, a sprocket rotatable for advancing film along the guide and arranged in axially fixed position between the walls, a rotatable and axially movable sprocket shaft coaxial with the sprocket and extending in angularly keyed relation through it, said shaft being journalled in the walls and extending through and beyond one of them, and an indexing assembly comprising a pair of detent members surrounding the shaft outwardly of said wall through which the sprocket shaft extends and relatively rotatable coaxially with each other and with the shaft, said detent members cooperating to exert detent action in relative rotative positions separated by angles predetermined to correspond with spacing of frames of a film engaged with the sprocket, one of said members being mounted on and rotating with the shaft and the other being mounted on the adjacent wall; framing means permitting rotation of the wall-mounted detent member with the shaft-mounted member to select the angular positions of the shaft in which the detent action is exerted comprising, a substantially cylindrical split ring secured against rotation to the adjacent wall coaxial with the shaft, said ring having a slot extending between its opening and periphery to permit change in its expansive condition, a cylindrical skirt rotatable surrounding said split ring and secured to the wall-mounted detent member to support the latter rotatably, a cam arranged in the slot of the split ring and rotatable therein to vary the expansive condition of the ring for permitting the wall-mounted detent member to rotate with the shaft-mounted member or locking it against such rotation, an actuating shaft extending coaxially from the cam through the adjacent wall and journalled in the latter, a conical surface carried by and coaxial with the sprocket shaft at the inner side of the wall, and a lever secured to said actuating shaft at the inner side of said wall and extending into contact with said conical surface for rotating the actuating shaft during axial movement of the sprocket shaft.

7. In an indexing assembly for exerting a detent action upon a rotatable shaft in a predetermined angular position, said assembly comprising a pair of detent members relatively rotatable and cooperating in predetermined angular relation to exert a detent action, one of said members rotating with the shaft and the other being mounted on a stationary support, and a knob for turning said shaft; means permitting selection of the angular position of the shaft in which detent action is exerted comprising, mounting means for the support-mounted detent member arranged to permit said member to be rotated by the cooperating detent member, a releasable clutch normally locking the support-mounted member to the support against such rotation, and actuating means for said clutch including an actuated cam member movable to engage and disengage said clutch and an actuating cam member operable by axial movement of said knob for moving said actuated cam member to engage and disengage said clutch.

ARTHUR J. BRADFORD.
CREBERT BURNHAM.

REFERENCES CITED

The following references are of record in the file of this patent:

UNITED STATES PATENTS

| Number | Name | Date |
| --- | --- | --- |
| 1,738,762 | De Vault | Dec. 10, 1929 |
| 1,939,561 | Martin | Dec. 12, 1933 |
| 2,033,038 | Lee | Mar. 3, 1936 |
| 2,126,474 | Kleerup | Aug. 9, 1938 |